(12) United States Patent
Qin (10) Patent No.: US 10,222,648 B2
(45) Date of Patent: Mar. 5, 2019

(54) LIQUID CRYSTAL DISPLAY PANEL AND DISPLAY DEVICE

(71) Applicant: BOE TECHNOLOGY GROUP CO., LTD., Beijing (CN)

(72) Inventor: Guangkui Qin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 60 days.

(21) Appl. No.: 15/504,000

(22) PCT Filed: May 24, 2016

(86) PCT No.: PCT/CN2016/083126
§ 371 (c)(1),
(2) Date: Feb. 14, 2017

(87) PCT Pub. No.: WO2017/148021
PCT Pub. Date: Sep. 8, 2017

(65) Prior Publication Data
US 2018/0107057 A1    Apr. 19, 2018

(30) Foreign Application Priority Data

Mar. 1, 2016  (CN) .......................... 2016 1 0115142

(51) Int. Cl.
| G02F 1/137 | (2006.01) |
| G02F 1/1335 | (2006.01) |
| G02F 1/1343 | (2006.01) |

(52) U.S. Cl.
CPC ...... *G02F 1/133528* (2013.01); *G02F 1/1343* (2013.01); *G02F 1/133504* (2013.01);
(Continued)

(58) Field of Classification Search
CPC ......... G02F 1/133528; G02F 1/133504; G02F 1/133524
See application file for complete search history.

(56) References Cited

U.S. PATENT DOCUMENTS

| 5,394,256 A * | 2/1995 | Yamada | ................ C09K 19/02 349/166 |
| 2006/0072054 A1* | 4/2006 | Ito | ................... G02F 1/133528 349/96 |

(Continued)

FOREIGN PATENT DOCUMENTS

| CN | 201097041 Y | 8/2008 |
| CN | 101424814 A | 5/2009 |

(Continued)

OTHER PUBLICATIONS

International Search Report and Written Opinion in PCT/CN2016/083126 dated Oct. 28, 2016, with English translation. 14 pages.

(Continued)

*Primary Examiner* — Lucy P Chien
(74) *Attorney, Agent, or Firm* — Womble Bond Dickinson (US) LLP (57) ABSTRACT

The embodiments of the present invention provide a liquid crystal display panel and a display device. The liquid crystal display panel includes a first substrate, a second substrate and a liquid crystal layer. A first grating layer is arranged on a side of a first basal substrate departing from the second substrate, a scattering layer is arranged on a side of the first grating layer departing from the second substrate, the first grating layer includes a plurality of first light shielding walls and first transparent columns arranged alternately. The liquid crystal in the liquid crystal layer is doped with a polymerizable liquid crystal monomer with a predetermined volume ratio. Normal display of bright and dark states can be realized without a polarizer, and the transmittance is improved. The phase retardation can also be achieved without the cooperation of polarizer and liquid crystal, eliminating the issue of viewing angle.

18 Claims, 5 Drawing Sheets

(52) U.S. Cl.
CPC .. *G02F 1/133524* (2013.01); *G02F 1/133602* (2013.01); *G02F 2001/13775* (2013.01)

(56) References Cited

U.S. PATENT DOCUMENTS

2016/0349607 A1   12/2016   Qin et al.
2017/0192223 A1   7/2017    Jiang et al.

FOREIGN PATENT DOCUMENTS

| CN | 101561571 A | 10/2009 |
| CN | 102879944 A | 1/2013 |
| CN | 103244875 A | 8/2013 |
| CN | 104834096 A | 8/2015 |
| CN | 104834127 A | 8/2015 |
| CN | 104865750 A | 8/2015 |
| CN | 105572959 A | 5/2016 |
| JP | 2005181744 A | 7/2005 |
| TW | 201403197 A | 1/2014 |
| WO | WO 2008023484 A1 | 2/2008 |

OTHER PUBLICATIONS

"First office action," CN Application No. 201610115142.1 (dated Mar. 23, 2018).
"Second office action," CN Application No. 201610115142.1 (dated May 16, 2018).

\* cited by examiner

LIQUID CRYSTAL DISPLAY PANEL AND DISPLAY DEVICE

RELATED APPLICATIONS

The present application is the U.S. national phase entry of the international application PCT/CN2016/083126, with an international filing date of May 24, 2016, which claims the benefit of Chinese Patent Application No. 201610115142.1, filed on Mar. 1, 2016, the entire disclosures of which are incorporated herein by reference.

TECHNICAL FIELD

The present invention relates to the field of display technology, in particular to a liquid crystal display panel and a display device.

BACKGROUND

At present, the liquid crystal display (LCD) panel technology is maturing. With the increase of the user's demand, the display performance and display effect of the LCD panel are also improved. Especially, the requirements for the optical efficiency and conversion efficiency of the electronic products manufactured with liquid crystal display panels become increasingly high.

In the existing liquid crystal display panel, an upper polarizer and a lower polarizer are required for realizing display of bright and dark states. However, due to the polarizing effect of the polarizer, light entering the liquid crystal display panel is partially absorbed, thereby reducing the transmittance of the liquid crystal display panel.

SUMMARY

The embodiments of the present invention provide a liquid crystal display panel and a display device. The situation of a low transmittance for backlight is thus improved, which is caused by the arrangement of the polarizers.

The embodiments of the present invention provide the following solutions.

An embodiment of the present invention provides a liquid crystal display panel. The liquid crystal display panel includes a first substrate, a second substrate arranged opposite to the first substrate, and a liquid crystal layer arranged between the first substrate and the second substrate. The first substrate includes a first basal substrate, a first grating layer is arranged on a side of the first basal substrate departing from the second substrate, a scattering layer is arranged on a side of the first grating layer departing from the second substrate. The first grating layer includes a plurality of first light shielding walls and first transparent columns arranged alternately. The liquid crystal in the liquid crystal layer is doped with a polymerizable liquid crystal monomer with a predetermined volume ratio.

In this embodiment, with the abovementioned structure, normal display of bright and dark states can be realized without a polarizer, and the transmittance of the liquid crystal display panel is improved effectively. Moreover, the cooperation of polarizer and liquid crystal for a phase retardation is no more required, eliminating the issue of viewing angle. Since the anchoring energy of the liquid crystal molecules doped with the polymerizable liquid crystal monomer is enhanced, the response speed of the liquid crystal molecules is improved accordingly. Therefore, the response speed of the liquid crystal display panel is improved during displaying, shortening the response time.

Optionally, the second substrate includes a second basal substrate, a second grating layer is arranged on a side of the second basal substrate facing the first substrate, the second grating layer includes a plurality of second light shielding walls arranged at predetermined intervals and penetrating the liquid crystal layer. The second light shielding walls of the second grating layer are one-to-one corresponding to the first light shielding walls of the first grating layer.

In this embodiment, the second grating layer can absorb the light beam scattered by the liquid crystal, on which liquid crystal a voltage is applied. The dark state effect can thus be improved.

Optionally, a reflective layer is arranged between the second basal substrate and the second grating layer. A pattern of the reflective layer corresponds to a grating pattern of the second grating layer.

In this embodiment, with the reflective layer, light emitted from the backlight and incident on the second grating layer can be prevented from being directly absorbed. The efficiency of light can thus be improved.

Optionally, the liquid crystal in the liquid crystal layer is doped with a polymerizable liquid crystal monomer with a volume ratio of 1%-10%.

Such a volume ratio can ensure forming a preferable network, so that the liquid crystal molecules can be deflected to different directions, scattering the light beam incident on the liquid crystal.

Optionally, at least one side of the liquid crystal layer is provided with a plurality of pixel electrodes, one or more pixel electrodes correspond to one of the first transparent columns.

Optionally, a material of the scattering layer is an anisotropic material.

In this embodiment, anisotropic material can ensure a good scattering effect.

Optionally, the liquid crystal display panel further includes a color film layer arranged on the first substrate and a TFT array arranged on the second substrate.

In this embodiment, by applying the color film layer and the TFT array, color pixels can be formed with the transparent columns, so as to realize color display.

Optionally, the liquid crystal molecules in the liquid crystal layer are all arranged in a horizontal orientation. Each of the first light shielding walls forms a one-dimensional strip shaped grating pattern. An orientation of a long axis of the liquid crystal molecule in the horizontal orientation is consistent with an extension direction of the one-dimensional strip shaped grating pattern.

In this embodiment, the liquid crystal molecules are arranged in a horizontal orientation. By applying a voltage on the liquid crystal molecules, the incident light beam can be scattered, so that the scattered light beam is absorbed by the strip shaped first grating layer, realizing dark state display effectively. When no voltage is applied on the liquid crystal molecules, the light beam can pass through the first grating layer. Since no polarizer is used, the transmittance of the liquid crystal display panel is improved.

Optionally, the liquid crystal molecules in the liquid crystal layer are all arranged in a vertical orientation, and the plurality of first light shielding walls form a two-dimensional grid shaped grating pattern.

In this embodiment, the liquid crystal molecules are arranged in a vertical orientation. By applying a voltage on the liquid crystal molecules, the incident light beam can be scattered, so that the scattered light beam is absorbed by the strip shaped first grating layer, realizing dark state display effectively. When no voltage is applied on the liquid crystal molecules, the light beam can pass through the first grating layer. Since no polarizer is used, the transmittance of the liquid crystal display panel is improved. Moreover, the two-dimensional grid shaped grating pattern is conducive to the formation of the pixel array, thereby realizing high resolution display.

An embodiment of the present invention also provides a display device. The display device includes the abovementioned liquid crystal display panel. The display device further includes a backlight. Light emitted from the backlight enters the liquid crystal display panel vertically.

In this embodiment, with the abovementioned structure, normal display of bright and dark states can be realized without a polarizer, and the transmittance of the liquid crystal display panel is improved effectively. Moreover, the phase retardation can be achieved without the cooperation of polarizer and liquid crystal, eliminating the issue of viewing angle. Since the anchoring energy of the liquid crystal molecules doped with the polymerizable liquid crystal monomer is enhanced, the response speed of the liquid crystal molecules is improved accordingly. Therefore, the response speed of the liquid crystal display panel is improved during displaying, shortening the response time. Moreover, since light emitted from the backlight enters the liquid crystal display panel vertically, the transmittance of the liquid crystal display panel in a bright state is improved.

Optionally, the liquid crystal molecules in the liquid crystal layer are arranged in a horizontal orientation, light emitted from the backlight is linearly polarized light, and a polarization direction of the linearly polarized light is perpendicular to an orientation of a long axis of the liquid crystal molecule in the horizontal orientation.

In this embodiment, linearly polarized light is applied to ensure a high transmittance for the display device in such a display mode.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

It should be noted that the below mentioned "first substrate" and "second substrate" can be construed respectively as a color film substrate and an array substrate. Alternatively, the first substrate and the second substrate can also be construed respectively as an upper substrate provided with a color film or without color film and a lower substrate provided with a TFT array or without TFT array.

The implementation of the present invention will be described below in more detail in combination with the drawings and the embodiments. The following embodiments are used for explanation of the present invention, not for limitation of the scope of the present invention.

Figure 1:
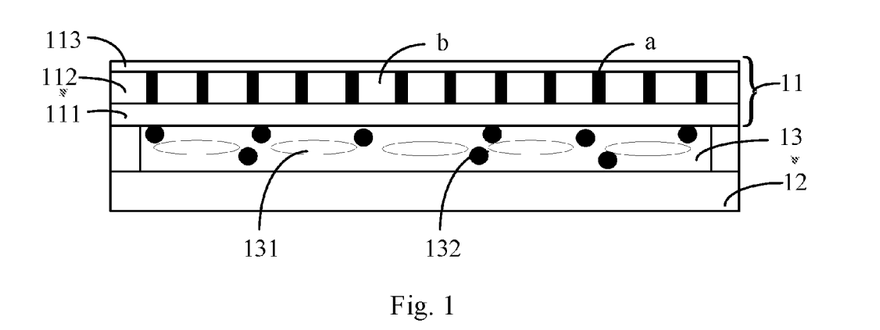
FIG. 1 is a structural schematic diagram of a liquid crystal display panel according to an embodiment of the invention.

FIG. 1 is a structural schematic diagram of a liquid crystal display panel according to an embodiment of the invention. The liquid crystal display panel includes a first substrate 11, a second substrate 12 arranged opposite to the first substrate 11, and a liquid crystal layer 13 arranged between the first substrate 11 and the second substrate 12. The first substrate 11 includes a first basal substrate 111. A first grating layer 112 is arranged on a side of the first basal substrate 111 departing from the second substrate 12. A scattering layer 113 is arranged on a side of the first grating layer 112 departing from the second substrate 12. The first grating layer 112 includes a plurality of first light shielding walls a and first transparent columns b arranged alternately. The liquid crystal 131 in the liquid crystal layer 13 is doped with a polymerizable liquid crystal monomer 132 with a predetermined volume ratio.

With the liquid crystal display panel shown in FIG. 1, the problem of low transmittance in a traditional liquid crystal display panel can be solved, which problem is caused by providing an upper polarizer and a lower polarizer on the liquid crystal display panel. In the liquid crystal display panel provided by the embodiment of the invention, the upper polarizer and the lower polarizer are not applied. Instead, a first grating layer and a scattering layer are arranged on the first substrate, the first substrate is applied as an upper substrate. The liquid crystal layer is doped with a polymerizable liquid crystal monomer with a predetermined volume ratio. When a voltage is applied, due to the existence of the polymerizable liquid crystal monomer, the liquid crystal molecules in the liquid crystal layer can be deflected to different directions, therefore the light beam incident on the liquid crystal layer is scattered and absorbed by the first grating layer after entering the first grating layer, so as to realize display of dark state. Since the light shielding wall in the first grating layer penetrates the whole first grating layer, the scattered light beam can be absorbed as much as possible, improving the effect of dark state display.

When no voltage is applied, the light beam incident on the liquid crystal layer is not scattered, then the light beam can pass through the first grating layer. Since the light beam passing through the first grating layer is a vertical light beam (i.e., the light beam is perpendicular to the surface of the liquid crystal display panel), the vertical light beam can be scattered evenly after passing through the scattering layer, thereby realizing bright state display. According to the embodiment of the invention, the upper polarizer and the lower polarizer are not applied, display of a bright state and a dark state can be achieved, the transmittance of the liquid crystal display panel can also be effectively improved. In addition, for the embodiment of the invention, another effect of cancelling the upper and lower polarizers is: the issue of viewing angle is eliminated. Since the cooperation of polarizer and liquid crystal for a phase retardation is no more required, the difference of phase retardation caused by different deflections of liquid crystal does not exist, so it will not lead to different transmittances. Moreover, in an embodiment of the invention, the liquid crystal layer is doped with a polymerizable liquid crystal monomer, such as RM257, therefore, the anchoring energy of liquid crystal molecules is enhanced, i.e., the elastic energy of liquid crystal molecules is enhanced. When the liquid crystal molecules are deflected, the response speed depends on the applied voltage. When the liquid crystal molecules return to the original state, the response speed depends on the elastic energy, namely the anchoring energy. Since the anchoring energy of the liquid crystal molecules doped with the polymerizable liquid crystal monomer is enhanced, the response speed of the liquid crystal molecules is improved accordingly. Therefore, the response speed of the liquid crystal display panel is improved during displaying, shortening the response time.

It should be noted that in the embodiments of the invention, the size of the first grating layer and the size of the grating pattern can be determined by the specific pixel size and the thickness of the substrate. For example, if the pixel size of the substrate is relatively large, then size for the grating pattern of the first grating layer is set to be large. That is, the width of the light shielding wall a can remain unchanged, and the width of the transparent column can be set to be large, increasing the slit size of the grating. Conversely, the slit size can be decreased. In another example, the thickness of the first grating layer can be determined based on the thickness of the display panel and the light absorption efficiency of the grating layer. In general, for a large pixel size, the thickness of the first grating layer should be large, so as to ensure the light absorption efficiency in a dark state, ultimately ensuring a certain contrast. On the other hand, considering the thickness of the display panel, the thickness of the first grating layer cannot be too large. Therefore, with a comprehensive consideration, the thickness of the first grating layer can be set within a certain range. Generally speaking, the thickness of the grating can be determined based on the gap of the grating (i.e., the interval between the adjacent light shielding walls of the first grating layer in FIG. 1, or the width of the transparent column), as long as the thickness of the grating is more than 2 times the gap size of the grating.

It should be further noted that the first grating layer provided by the embodiment of the invention is different with the grating structure of the prior art. As can be seen from FIG. 1, the cross section structure shows that the first grating layer includes the light shielding walls a and the transparent columns b. As has been described above, the width of the light shielding wall a and the transparent column b should be determined based on the size of the pixel. In a specific forming process, a layer of light shielding film (e.g., a material of black matrix) is deposited on the first basal substrate. Then, a plurality of light shielding walls are formed with a composition process. Next, a transparent material with the same thickness is deposited on the first basal substrate, forming a plurality of transparent columns and light shielding walls arranged alternately. Finally, the first grating layer shown in FIG. 1 is formed.

Figure 2:
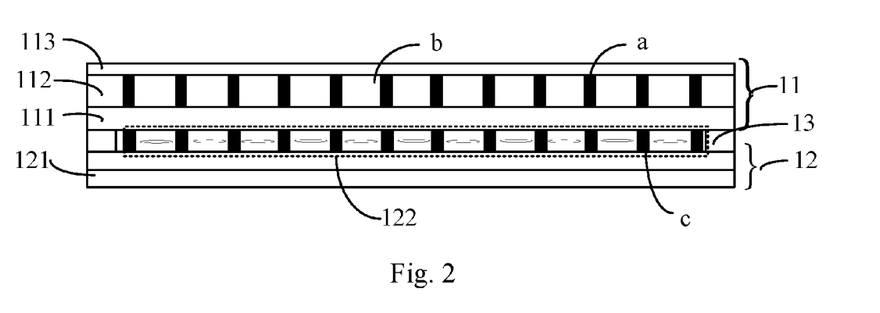
FIG. 2 is a structural schematic diagram of a liquid crystal display panel according to another embodiment of the invention.

Further, in an embodiment of the invention, as shown in FIG. 2, the second substrate 12 includes a second basal substrate 121, a second grating layer 122 is arranged on a side of the second basal substrate 121 facing the first substrate 11, the second grating layer 122 includes a plurality of second light shielding walls c arranged at predetermined intervals and penetrating the liquid crystal layer 13. The grating pattern of the second grating layer 122 corresponds to the grating pattern of the first grating layer 112, i.e., the second light shielding walls c of the second grating layer 122 are one-to-one corresponding to the first light shielding walls a of the first grating layer 112.

In the embodiment shown in FIG. 2, with the second grating layer, the light absorption efficiency for the scattered light beam can be improved. Therefore, when a voltage is applied on the liquid crystal layer, the liquid crystal molecules are deflected irregularly, a part of the scattered light beam can then be absorbed in the liquid crystal layer, improving the light absorption efficiency for the scattered light beam. Moreover, the grating pattern of the second grating layer corresponds to the grating pattern of the first grating layer, that is, the light shielding wall of the second grating layer and the light shielding wall of the first grating layer are arranged in alignment with each other. Thus, on the one hand, when the voltage is applied, the scattered light beam from the backlight can be absorbed by the grating to the maximum extent, on the other hand, the light beam emitted from the backlight can pass through the grating to the maximum extent when no voltage is applied.

In consideration of the deviation of the alignment accuracy of the first substrate and the second substrate, the grating pattern of the second grating layer can also be not corresponding to the grating pattern of the first grating layer. For example, the interval between the adjacent light shielding walls of the second grating layer can be large (i.e., the width of the transparent column is large), the interval between the adjacent light shielding walls of the first grating layer is relatively small. In this way, it can also be ensured that the light beam emitted from the backlight can pass through the grating to the maximum extent.

Figure 3:
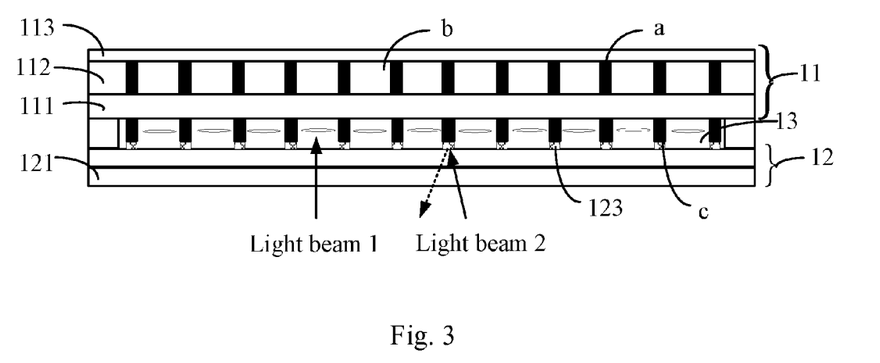
FIG. 3 is a structural schematic diagram of a liquid crystal display panel according to still another embodiment of the invention.

Further, in an embodiment of the invention, as shown in FIG. 3, a reflective layer 123 is arranged between the second basal substrate 121 and the second grating layer 122. The pattern of the reflective layer 123 corresponds to the grating pattern of the second grating layer 122. From the structure shown in FIG. 3, it can be seen that the light beam 1 can enter the second grating layer. If there is no reflective layer, the light beam 2 will be directly absorbed by the second grating layer. The embodiment of the invention is provided with a reflective layer, then the light beam 2 can be reflected back by the reflective layer and enters the liquid crystal layer 13. Therefore, the light beam is prevented from being directly absorbed by the second grating layer, improving the utilization ratio of light.

It should be noted that, though the second grating layer and the reflective layer are located in the liquid crystal layer, in this disclosure they should be considered as layers belonging to the second substrate.

Optionally, the liquid crystal in the liquid crystal layer is doped with a polymerizable liquid crystal monomer with a volume ratio of 1%-10%. In particular, a certain volume of RM257 can be applied. Based on a predetermined volume ratio, RM257 can be doped in the original positive or negative liquid crystal. The liquid crystal doped with RM257 forms a network structure when a voltage is applied. Therefore, the incoming light beam is scattered by the network structure and absorbed by the first grating layer and the second grating layer.

Optionally, at least one side of the liquid crystal layer is provided with a plurality of pixel electrodes, one or more pixel electrodes correspond to one of the first transparent columns.

In order to realize driving the liquid crystal and display of the pixels, opposite electrodes can be arranged on both sides of the liquid crystal layer respectively. An electrode such as the IPS (In-Plane Switching) electrode can also be arranged on only one side of the liquid crystal layer. One transparent column can be controlled by one pixel electrode, and the gray level of the pixel can be controlled by applying different voltages to the pixel electrode. Similarly, one transparent column can also be controlled by a plurality of pixel electrodes, and the gray level of the pixel can be controlled by applying different combinations of voltage to the plurality of pixel electrodes.

Optionally, after passing through the first grating layer, the light beam can be scattered evenly after passing through a scattering layer, thereby realizing bright state display. In order to improve the scattering degree of the forward scattering and reduce the backscattering, an anisotropic material can be selected as the material of the scattering layer. In some embodiments of the invention, scattering films of other materials can also be used.

Figure 4:
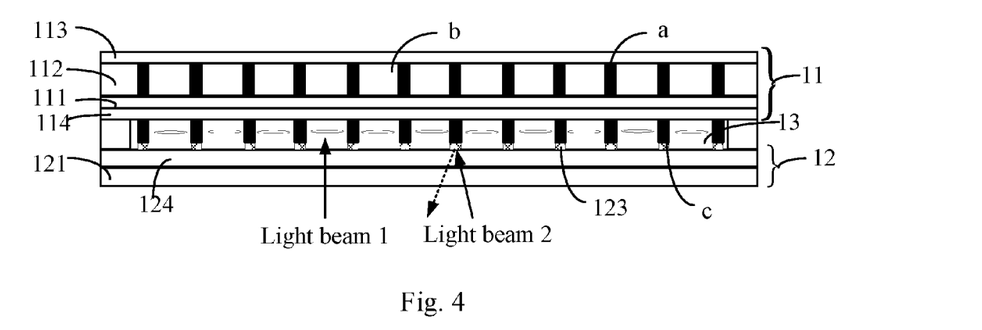
FIG. 4 is a structural schematic diagram of a liquid crystal display panel according to yet another embodiment of the invention.

Further, as shown in FIG. 4, in an embodiment of the invention, the liquid crystal display panel further includes a color film layer 114 arranged on the first substrate 11 and a TFT array 124 arranged on the second substrate 12. Since the structure of these films and layers is the same with the existing structure, flat film layers are used in FIG. 4 to indicate them. The specific structure of these films and layers can be found in the existing structure of the corresponding type, it will not be repeated herein. By applying the color film layer and the TFT array, the transparent columns can form color pixels for realizing color display.

In the following, detailed description will be introduced to illustrate two types of liquid crystal arrangement.

1. Liquid Crystal Arranged in a Horizontal Orientation

Figure 5:
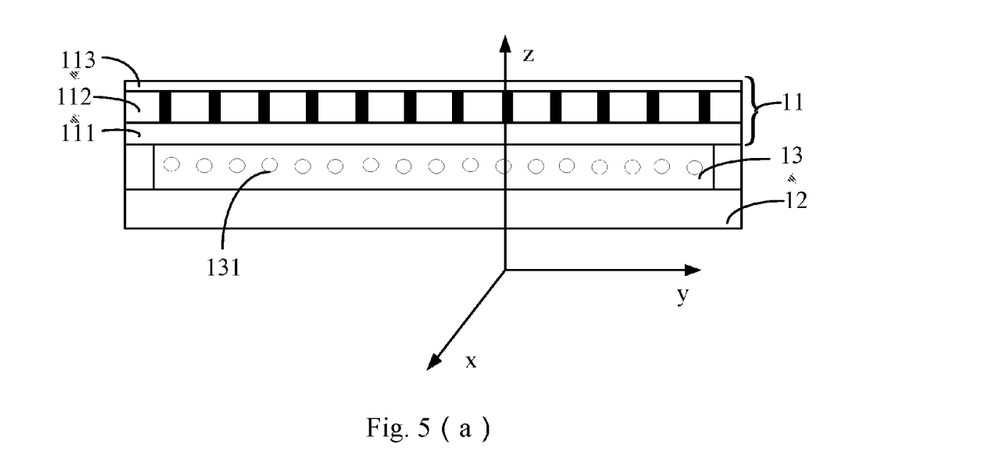
FIG. 5(a) and FIG. 5(b) are structural schematic diagrams of a liquid crystal display panel, in which the liquid crystal molecules are arranged in a horizontal orientation.

As shown in FIG. 5(a), for the structure of the liquid crystal display panel shown in FIG. 1, the liquid crystal molecules 131 in the liquid crystal layer 13 are all arranged in a horizontal orientation. Each of the first light shielding walls a forms a one-dimensional strip shaped grating pattern. An orientation of a long axis of the liquid crystal molecule 131 in the horizontal orientation is consistent with an extension direction of the one-dimensional strip shaped grating pattern.

In particular, a three-dimensional coordinate system is set up, the substrate surface of the first substrate or the second substrate is xy plane, and the direction perpendicular to the xy plane is z axis. From the top view shown in FIG. 5(b) it can be seen that the liquid crystal molecules 131 in the liquid crystal layer are arranged along the x axis. The first light shielding walls a of the first grating layer 112 are also arranged along the x axis in the xy plane, forming a one-dimensional strip shaped grating pattern. By applying a voltage on the liquid crystal molecules arranged in the horizontal direction, the light beam entering the liquid crystal layer is scattered along the direction perpendicular to the long axis of the liquid crystal molecule. That is, the light beam is scattered along the direction of the y axis, rather than travel along the previous direction of the z axis. The scattered light is then absorbed by the first grating layer including the one-dimensional stripe shaped grating pattern, achieving dark state display.

2. Liquid Crystal Arranged in a Vertical Orientation

Figure 6:
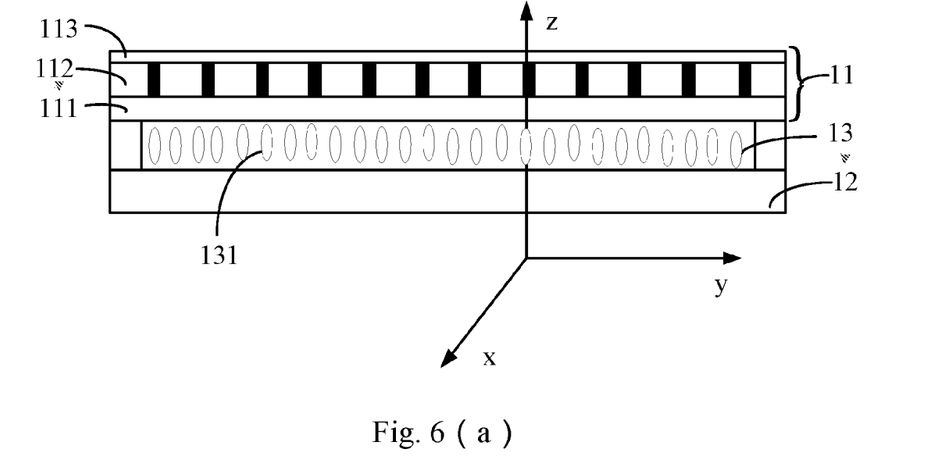
FIG. 6(a)-FIG. 6(c) are structural schematic diagrams of a liquid crystal display panel, in which the liquid crystal molecules are arranged in a vertical orientation.

As shown in FIG. 6(a) and FIG. 6(b), the liquid crystal molecules 131 in the liquid crystal layer 13 are all arranged in a vertical orientation, and the plurality of first light shielding walls a form a two-dimensional grid shaped grating pattern. Similarly, from the top view shown in FIG. 6(b) it can be seen that the liquid crystal molecules 131 are arranged along the direction of the z axis. The first light shielding walls a of the first grating layer 112 are arranged along the directions of the x axis and the y axis in the xy plane, and extend in a cross manner, forming a two-dimensional grid shaped grating pattern. By applying a voltage on the liquid crystal molecules arranged in the vertical direction, the light beam entering the liquid crystal layer is scattered along random directions in the xy plane. The light scattered in the xy plane is then absorbed by the first grating layer with the two-dimensional grid shaped grating pattern, achieving dark state display. FIG. 6(a) and FIG. 6(b) are respectively section views along the z-z line and s-s line in FIG. 6(c). Moreover, the two-dimensional grid shaped grating pattern is conducive to the formation of the pixel array, thereby realizing high resolution display.

Based on the same creative concept of the abovementioned liquid crystal display panel, an embodiment of the present invention also provides a display device.

Figure 7:
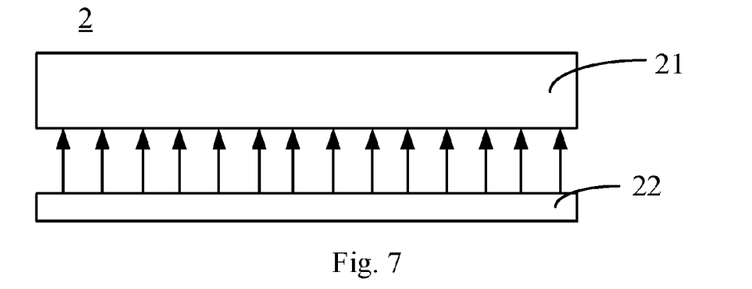
FIG. 7 is a structural schematic diagram of a display device according to an embodiment of the invention.

FIG. 7 is a structural schematic diagram of the display device provided by the embodiment of the invention. The display device 2 includes the abovementioned liquid crystal display panel 21. The display device 2 further includes a backlight 22. Light emitted from the backlight 22 enters the liquid crystal display panel 21 vertically. Since light from a common light source is emitted in a range of 360 degrees, light emitted by the backlight 22 can be processed with an optical device to form the required vertical light beam. The embodiment of the invention does not limit the optical device, many of the existing optical devices can realize such a function. The display device can be any product or component with display function, such as mobile phone, tablet computer, TV, display, notebook computer, digital photo frame and navigator. Other essential components of the display device should all be possessed as understood by the ordinary skilled person in the art, which will not be repeated here, and should not be taken as limitations to the present invention either.

It should be noted that in the embodiment of the invention, the direction of the light beam is defined in such a manner for the following reason: taking into account the grating structure in the liquid crystal display panel, in order to improve the efficiency of light, the vertical light beam is used to avoid excessive light being absorbed by the grating, and ensure that more light passes through the grating in bright state display. Compared with the existing technology, the utilization ratio of light is significantly improved.

Optionally, the liquid crystal molecules in the liquid crystal layer are arranged in a horizontal orientation, light emitted from the backlight is linearly polarized light, and a polarization direction of the linearly polarized light is perpendicular to an orientation of a long axis of the liquid crystal molecule in the horizontal orientation.

Figure 8:
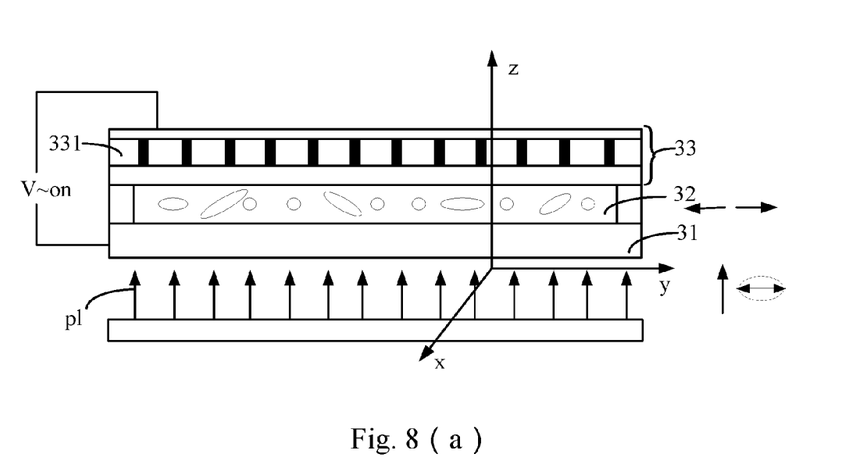
FIG. 8(a) and FIG. 8(b) are schematic diagrams respectively showing working states of a liquid crystal display panel with or without an applied voltage.

In particular, FIG. 8(*a*) and FIG. 8(*b*) are schematic diagrams respectively showing working states of a liquid crystal display panel with or without an applied voltage. For the structure of the liquid crystal display panel shown in FIG. 1, it is assumed that the liquid crystal molecules in the liquid crystal layer are arranged in the direction of the x axis, the light beam emitted from the backlight is a vertical light beam, which is also a linearly polarized light p1 with a polarization direction along the x axis. The linearly polarized light p1 passes through the lower substrate 31 without a second grating layer and enters the liquid crystal layer 32. The liquid crystal molecules are originally arranged in the direction of the x axis. If a voltage (usually a preset threshold voltage Vth) is applied, as shown in FIG. 8 (*a*), since the liquid crystal layer 32 is doped with a polymerizable liquid crystal monomer, the orientations of the liquid crystal molecules are inconsistent with each other. Therefore, the polarized light p1 entering the liquid crystal layer 32 is scattered, and the scattering direction is the direction of the y axis, which is perpendicular to the x axis. Since the one-dimensional grating pattern of the first grating layer 331 in the upper substrate 33 is strip shaped and extends along the x axis, only the light beam scattering along the x axis can pass through. In this way, the scattering direction of the polarized light p1 is perpendicular to the extending direction of the one-dimensional grating pattern, and the scattered polarized light p1 is absorbed by the first grating layer, realizing dark state display of the liquid crystal display panel. If no voltage is applied, as shown in FIG. 8 (*b*), the long axis of the liquid crystal molecules in the liquid crystal layer 32 is oriented along the x axis, the polarized light p1 entering the liquid crystal layer 32 is not scattered and keeps the polarization direction along the x axis. Since the polarization direction of the polarized light p1 is parallel to the extending direction of the one-dimensional grating pattern, the polarized light p1 can pass through the first grating layer, realizing bright state display of the liquid crystal display panel.

The polarization direction of the light beam emitted from the backlight is not limited for panels with other liquid crystal arrangements. Therefore, the light beam emitted from the backlight can be an unpolarized light or a polarized light with an arbitrary polarization direction.

The above embodiments are only optional embodiments of the present invention, the ordinary skilled person in the related technical field, in the case of not departing from the spirit and scope of the present invention, may also make various modifications and variations. Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A liquid crystal display panel comprising a first substrate, a second substrate arranged opposite to the first substrate, a liquid crystal layer arranged between the first substrate and the second substrate;
    wherein the first substrate comprises a first basal substrate, a first grating layer is arranged on a side of the first basal substrate departing from the second substrate, a scattering layer is arranged on a side of the first grating layer departing from the second substrate, the first grating layer comprises a plurality of first light shielding walls and first transparent columns arranged alternately;
    wherein liquid crystal in the liquid crystal layer is doped with a polymerizable liquid crystal monomer with a predetermined volume ratio;
    and wherein at least one side of the liquid crystal layer is provided with a plurality of pixel electrodes, the plurality of pixel electrodes correspond the first transparent columns one-to-one respectively.

2. The liquid crystal display panel according to claim 1, wherein the second substrate comprises a second basal substrate, a second grating layer is arranged on a side of the second basal substrate facing the first substrate, the second grating layer comprises a plurality of second light shielding walls arranged at predetermined intervals and penetrating the liquid crystal layer;
    and wherein the second light shielding walls of the second grating layer are one-to-one corresponding to the first light shielding walls of the first grating layer.

3. The liquid crystal display panel according to claim 2, wherein a reflective layer is arranged between the second basal substrate and the second grating layer; and wherein a pattern of the reflective layer corresponds to a grating pattern of the second grating layer.

4. The liquid crystal display panel according to claim 1, wherein the liquid crystal in the liquid crystal layer is doped with a polymerizable liquid crystal monomer with a volume ratio of 1%-10%.

5. The liquid crystal display panel according to claim 1, wherein a material of the scattering layer is an anisotropic material.

6. The liquid crystal display panel according to claim 1, further comprising:
    a color film layer arranged on the first substrate and a TFT array arranged on the second substrate.

7. The liquid crystal display panel according to claim 1, wherein liquid crystal molecules in the liquid crystal layer are all arranged in a horizontal orientation, each of the first light shielding walls forms a one-dimensional strip shaped grating pattern; and wherein an orientation of a long axis of the liquid crystal molecule in the horizontal orientation is consistent with an extension direction of the one-dimensional strip shaped grating pattern.

8. The liquid crystal display panel according to claim 1, wherein liquid crystal molecules in the liquid crystal layer are all arranged in a vertical orientation, and the plurality of first light shielding walls form a two-dimensional grid shaped grating pattern.

9. A display device comprising the liquid crystal display panel according to claim 1, further comprising a backlight; wherein light emitted from the backlight enters the liquid crystal display panel vertically.

10. The display device according to claim 9, wherein liquid crystal molecules in the liquid crystal layer are arranged in a horizontal orientation, light emitted from the backlight is linearly polarized light, and a polarization direction of the linearly polarized light is perpendicular to an orientation of a long axis of the liquid crystal molecule in the horizontal orientation.

11. The display device according to claim 9, wherein the second substrate comprises a second basal substrate, a second grating layer is arranged on a side of the second basal substrate facing the first substrate, the second grating layer comprises a plurality of second light shielding walls arranged at predetermined intervals and penetrating the liquid crystal layer;
    and wherein the second light shielding walls of the second grating layer are one-to-one corresponding to the first light shielding walls of the first grating layer.

12. The display device according to claim 11, wherein a reflective layer is arranged between the second basal substrate and the second grating layer; and wherein a pattern of the reflective layer corresponds to a grating pattern of the second grating layer.

13. The display device according to claim 9, wherein the liquid crystal in the liquid crystal layer is doped with a polymerizable liquid crystal monomer with a volume ratio of 1%-10%.

14. The display device according to claim 9, wherein a material of the scattering layer is an anisotropic material.

15. The display device according to claim 9, further comprising:
a color film layer arranged on the first substrate and a TFT array arranged on the second substrate.

16. The display device according to claim 9, wherein liquid crystal molecules in the liquid crystal layer are all arranged in a horizontal orientation, each of the first light shielding walls forms a one-dimensional strip shaped grating pattern; and wherein an orientation of a long axis of the liquid crystal molecule in the horizontal orientation is consistent with an extension direction of the one-dimensional strip shaped grating pattern.

17. The display device according to claim 9, wherein liquid crystal molecules in the liquid crystal layer are all arranged in a vertical orientation, and the plurality of first light shielding walls form a two-dimensional grid shaped grating pattern.

18. The display device according to claim 11, wherein liquid crystal molecules in the liquid crystal layer are all arranged in a horizontal orientation, each of the first light shielding walls forms a one-dimensional strip shaped grating pattern; and wherein an orientation of a long axis of the liquid crystal molecule in the horizontal orientation is consistent with an extension direction of the one-dimensional strip shaped grating pattern.

* * * * *